United States Patent [19]
Miyazaki et al.

[11] Patent Number: 6,011,388
[45] Date of Patent: *Jan. 4, 2000

[54] ROLLING BEARING UNIT WITH ROTATING SPEED SENSOR HAVING AN ANNULAR TONE WHEEL

[75] Inventors: Hiroya Miyazaki; Junshi Sakamoto; Hayato Ohmi, all of Fujisawa, Japan

[73] Assignee: NSK Ltd., Tokyo, Japan

[ * ] Notice: This patent is subject to a terminal disclaimer.

[21] Appl. No.: 08/910,131

[22] Filed: Aug. 13, 1997

Related U.S. Application Data

[63] Continuation of application No. 08/616,755, Mar. 15, 1996, Pat. No. 5,670,874.

[30] Foreign Application Priority Data

Mar. 16, 1995 [JP] Japan ......................................... 7-56909
Jun. 28, 1995 [JP] Japan ....................................... 7-161683

[51] Int. Cl.[7] .............................. G01B 7/14; G01P 3/44; G01P 3/488; G01P 3/487
[52] U.S. Cl. ...................... 324/174; 324/207.25; 384/448
[58] Field of Search ..................................... 324/173, 174, 324/207.22, 207.25; 310/155, 168, 171; 384/448

[56] References Cited

U.S. PATENT DOCUMENTS

| | | |
|---|---|---|
| 5,140,261 | 8/1992 | Seo et la. ................................ 324/174 |
| 5,296,805 | 3/1994 | Clark et al. . |
| 5,547,290 | 8/1996 | Ouchi et al. ........................ 324/207.25 |
| 5,670,874 | 9/1997 | Miyazahi et al. ........................ 324/174 |

FOREIGN PATENT DOCUMENTS

| | | |
|---|---|---|
| 0 306 850 | 3/1989 | European Pat. Off. . |
| 0 464 405 | 1/1992 | European Pat. Off. . |
| 2 281 628 | 3/1995 | United Kingdom . |

*Primary Examiner*—Walter E. Snow
*Attorney, Agent, or Firm*—Evenson, McKeown, Edwards & Lenahan, PLLC

[57] ABSTRACT

A rolling bearing unit with rotating speed sensor comprising a stationary outer ring member having an outer ring raceway on an inner peripheral face thereof, a rotatable inner ring member having an inner ring raceway on an outer peripheral face thereof, a plurality of rolling elements provided between the outer ring raceway and the inner ring raceway, an annular tone wheel secured to the end portion of the inner ring member and having a cylindrical peripheral portion formed with rotating cutouts circumferentially with a uniform space therebetween, a cover comprising a synthetic resin block and a metal portion and having a cylindrical engaging portion fixed to the open end portion of the outer ring member by engaging the engaging portion with the inner peripheral face of the outer ring member, an annular sensor embedded in the resin block having a peripheral face such that the peripheral face thereof opposes partly the peripheral portion of the tone wheel, and a guide formed on at least one of the tone wheel and the sensor to make the tone wheel and sensor overlapped radially with each other.

4 Claims, 12 Drawing Sheets

ROLLING BEARING UNIT WITH ROTATING SPEED SENSOR HAVING AN ANNULAR TONE WHEEL

This is a Continuation of application Ser. No. 08/616,755, filed Mar. 15, 1996, now U.S. Pat. No. 5,670,874.

FIELD OF THE INVENTION

This invention is related to a rolling bearing unit with rotating speed sensor to rotatably support a vehicle wheel with respect to a suspension apparatus and to detect the rotating speed of the vehicle wheel.

DESCRIPTION OF THE PRIOR ART

Various constructions for a rolling bearing unit with rotating speed sensor to detect rotating speed of a vehicle wheel are known up to now in order that the vehicle wheel is supported with respect to the suspension freely rotatably while an anti-lock brake system (ABS) or a traction control system (TCS) is controlled.

The rotating speed sensor which is installed in the rolling bearing unit has a tone wheel which rotates with the vehicle wheel and a sensor which outputs a signal changing in proportion to the rotating speed of the tone wheel.

Various types of tone wheels and sensors are known up to now. The rotating speed sensor of the passive type which uses the tone wheel made of magnetic material such that the voltage generated in the coil of the sensor changes according to the rotation of the tone wheel is used widely, because it does not use expensive components.

The passive type of the rotating speed sensor which comprises an annular sensor to make the output of the sensor larger as shown, for example, in HATSUMEI KYOKAI Technical Report Publication No. 94-16051 is known in the prior art.

FIGS. 1 and 2 show the rolling bearing unit with rotating speed sensor as disclosed in this Technical Report Publication.

A hub 1 has an axially outer end portion which is formed with a flange 2 for wheel fixture on its outer peripheral face, a mid-portion which is formed with an inner ring raceway 3a and a stepped portion 4 on its outer peripheral face, and an axially inner end portion which has an inner ring member 5 provided on its outer peripheral face.

The term "axially outer" in the specification means the outer side in a widthwise direction when installed in the vehicle; left in figures, and the term "axially inner" means the center side in a widthwise direction when installed in the vehicle; right in figures.

The inner ring member 5 is formed with an inner ring raceway 3b and externally fitted to the outer peripheral face of the hub 1 with an axially outer end face thereof abutted against the stepped portion 4.

A male-threaded portion 6 is formed on the axially inner end portion of the hub 1. The inner ring member 5 is fixed at a predetermined location on the outer peripheral face of the hub 1 by means of a nut 7 which is threaded onto the threaded portion 6 and tightened, thus constituting an inner ring assembly together with the hub 1.

There is also the case where, instead of directly forming the inner ring raceway 3a on the outer peripheral face of the hub 1, it is formed as an inner ring member (not shown) separate from the hub 1, and externally fitted to the hub 1 together with the inner ring member 5. In this sense, the hub 1 is also an inner ring member.

An outer ring member 8 located around the hub 1 has a mid-portion which is provided with an attachment portion 9 on an outer peripheral face thereof, for fixing the outer ring member 8 to a suspension unit (not shown).

An inner peripheral face of the outer ring member 8 is formed with outer ring raceways 10a, 10b opposite to the inner ring raceways 3a, 3b respectively.

A plurality of rolling elements 11, specifically balls, are respectively provided between the two inner ring raceways 3a, 3b and the pair of outer ring raceways 10a, 10b, so that the hub 1 is rotatable inside the outer ring member 8.

In the case of a hub unit for heavy vehicles, tapered rollers are used for the rolling elements instead of the balls shown FIGS. 1 and 2.

A seal ring 12 is fitted between the inner peripheral face at the axially outer end of the outer ring member 8, and the outer peripheral face of the hub 1, to cover the opening at axially outer end of the space in which the plurality of rolling elements 11 are provided between the inner peripheral face of the outer ring member 8 and the outer peripheral face of the hub 1.

A tone wheel 13 has a base end portion (left end in FIGS. 1 and 2) which is externally fixed to a portion on an axially inner end of the inner ring member 5 which is spaced away from the inner ring raceway 3b.

The tone wheel 13 is made of magnetic metal plate such as steel plate, and is entirely annular or short-cylindrical. The tone wheel 13 comprises a smaller-diameter portion 14 and a larger-diameter portion 15 that are continuous through a stepped portion 16 and concentric with each other. This kind of tone wheel 13 is fixed to and supported by the inner ring member 5, such that the larger-diameter portion 15 is fitted around the outer peripheral face on the axially inner end portion of the inner ring member 5, so that the stepped portion 16 comes in contact with the axially inner edge of the inner ring member 5. Therefore, the smaller-diameter portion 14 is supported so that it is concentric with the inner ring member 5.

There are several through holes 17 formed around the smaller-diameter portion 14 at equal intervals in the circumferential direction to form a first cut-out section where the magnetic characteristics change alternately at equal intervals in the circumferential direction.

These through holes 17 are identical in shape and specifically rectangular shaped to extend in the axial direction (left and right in FIGS. 1 and 2). Only the cross portion of one of the through holes 17 is shown in figures for simplicity.

An opening portion at the axially inner end portion of the outer ring member 8 is covered with a cover 18 made for example by deep drawing a metal sheet such as stainless steel plate, or aluminum alloy plate into the form of a bottomed cylinder.

An annular synthetic resin block 21 in which is embedded an annular sensor 20 is fixed and retained within the cylindrical portion 19 of the cover 18. This sensor 20 comprises a permanent magnet 22, a stator 23 made of magnetic material such as steel plate, and a coil 24. By embedding the permanent magnet 22, stator 23 and coil 24 in the synthetic resin block 21, the sensor 20 can be made generally annular.

Of these components which make up the sensor 20, the permanent magnet 22 is formed in a generally annular or circular ring shape and magnetized so that its magnetic orientation is in the radial direction. The inner peripheral face of this permanent magnet 22 is faced, through a small clearance 25, to the outer peripheral face of a base portion of the smaller diameter portion 14 of the tone wheel 13 where the through holes 17 are not formed.

The stator 23 is formed in a generally annular shape and has a radially outer cylindrical portion 26 and a radially inner cylindrical portion 27 connected to each other through a radial portion in a substantially J-shaped cross portion. The inner peripheral face on the axially outer end of the radially outer cylindrical portion 26 of the stator 23 is very near or comes in contact with the outer peripheral face of the permanent magnet 22. Moreover, the inner peripheral face of the radially inner cylindrical portion 27 of the stator 23 is faced to a tip portion of the tone wheel 13 where the through holes 17 are formed.

Furthermore, a plurality of notches 28 with an axial open end are formed in a second cut-out section around the radially inner cylindrical portion 27 of the stator 23, so that they are located around the cylindrical portion 27 circumferentially with the same pitch as the through holes 17. This pitch is referred to as center-angle pitch. Accordingly, the radially inner cylindrical portion 27 is formed so that it is comb-toothed.

The coil 24 is formed by winding a conductive wire around a non-magnetic bobbin 29 so that it is annular shaped, and it is located on the inner peripheral side of the radially outer cylindrical portion 26 of the stator 23. The electromotive force (emf) generated in this coil 24 is output from a connnector 30 that protrudes from the outside surface of the cover 18.

When using the rolling bearing unit with rotating speed sensor constructed as described above, as the tone wheel 13 rotates with the hub 1, the density of the magnetic flux flowing in the stator 23, which is faced to the tone wheel 13, changes, so that the voltage generated in the coil 24 changes at a frequency that is proportional to the rotational speed of the hub 1. The theory behind the change of voltage generated in the coil 24 due to the change in density of the magnetic flux flowing in the stator 23 is the same as that applied for rotating speed sensor that have been widely used in the prior art.

The reason that the density of the magnetic flux flowing in the stator 23 changes due to the rotation of the tone wheel 13 is described below.

The through holes 17 formed around the tone wheel 13 and the notches 28 formed around the stator 23 have the same pitch, so that as the tone wheel 13 rotates, there are moments when they are all faced to each other at the same time. At the moment when these holes 17 and notches 28 are faced to each other, the magnetic column portions located between each pair of adjacent holes 17 and the magnetic tongue-shaped portions located between each pair of adjacent notches 28 are faced to each other through a small clearance 25 between them. When the magnetic column portions and magnetic tongue-shaped portions are faced to each other, the density of the magnetic flux flowing between the tone wheel 13 and the stator 23 is high.

In contrast to this state, when the holes 17 and notches 28 are half out of phase, the density of the magnetic flux flowing between the tone wheel 13 and the stator 23 becomes low. In other words, in this state, the holes 17 formed around the tone wheel 13 are faced to the tongue-shaped portions, while at the same time, the notches 28 formed around the stator 23 are faced to the column portions. When the column portions are faced to the notches 28 and the tongue-shaped portions are faced to the holes 17, there is a comparatively large gap or clearance between the tone wheel 13 and the stator 23 generally in the circumference. In this state, the density of the magnetic flux flowing between the tone wheel 13 and the stator 23 becomes low. As the result, the voltage generated in the aforementioned coil 24 changes proportionally with the rotational speed of the hub 1.

By using a sensor 20 like described above, the output voltage generated in the coil 24 changes with a frequency proportional to the rotational speed of the hub 1. There is an annular, existing space in the opening end portion of the outer ring member 8. It is possible to utilize this annular limited space for installing the sensor 20 to make the output of the sensor 20 sufficiently large enough to reliably detect the rotational speed of the vehicle wheel rotating together with the hub 1.

The permanent magnet 22, the stator 23 and the coil 24, which make up the sensor 20 are all formed in an annular shape that entirely surrounds the tone wheel 13. Since the magnetic flux that comes from the permanent magnet 22 flows all the way around the stator 23, the amount of magnetic flux that flows generally through the stator 23 can be made sufficiently large enough. Thus the change in voltage on the coil 24 that corresponds to the change in density of the magnetic flux passing through the stator 23, can be made large.

The prior art rotating speed sensor having the annular sensor 20 can have a larger output than those having the rod shaped sensor which had been known in the art.

On the other hand, in order that the rotating speed sensor is so small in size as to be installed in a compact car with an enough sensor output maintained, a rolling bearing unit with rotating speed sensor as shown in FIG. 3 is disclosed in the copending JP Patent Applications No. H7-29560 and No. H7-133601.

In the construction of the copending JP Patent Applications, the rotational speed sensor comprises a tone wheel 13 and a sensor 20. The tone wheel 13 is formed in a generally cylindrical shape from a magnetic metal plate such as steel plate, and comprises a smaller diameter portion or fixing cylindrical portion 14 and a larger diameter portion or detecting cylindrical portion 15. The axially inner end rim of the smaller diameter portion 14 is connected to the axially outer end rim of the larger diameter portion 15 by a stepped portion 16 giving a crank shape in cross section.

The tone wheel 13 is secured to the inner ring member 5 by press fitting the smaller diameter portion 14 onto the axially inner end portion of the inner ring member 5.

With the tone wheel 13 fixed to the inner ring member 5 in this manner, the larger diameter portion 15 is located around the periphery of the nut 7 which clamps the inner ring member 5.

Cut-outs 31 are formed in the larger diameter portion 15 at even spacing around the circumference, with tongue portions of magnetic material between pairs of circumferentially adjacent cut-outs 31, thus forming a rotating cutout section. The larger diameter portion 15 is thus formed with comb like teeth.

Incidentally, the rotating cutout section can be provided only on the inner peripheral face of the larger diameter portion 15. Specifically, lands and recesses of the internal gear type are formed on the inner peripheral face of the larger diameter portion 15, with the recesses performing the role of cutouts.

In addition, through holes 17 as shown in the prior art construction can be used for the rotating cutout section.

The sensor 20 comprises a permanent magnet 22, first and second stators 32, 33 formed from a magnetic metal plate with an L-shape in cross section, and a coil 24. The permanent magnet 22, first and second stators 32, 33 and coil 24 are respectively formed in an annular shape and embedded in a synthetic resin block 21.

The permanent magnet 22 is magnetized in the axial direction (left/right direction in FIG. 3) around the whole periphery, with the magnetized direction unchanged therearound.

The axially inner face (right face in FIG. 3) of a radially inner, base end portion of the first stator 32 is abutted against the axially outer end face (left end face in FIG. 3) of the permanent magnet 22, while an outer peripheral face of a radially outer, tip end portion of the first stator 32 is faced to a central portion on the inner peripheral face of the larger diameter portion 15, across a small gap 25.

Moreover the axially outer face (left face in FIG. 3) of a radially inner, base end portion of the second stator 33 is abutted against the axially inner end face (right end face in FIG. 3) of the permanent magnet 22, while an outer peripheral face of a radially outer, tip end portion of the second stator 33 is faced to the inner peripheral face of the tip end portion (right end in FIG. 3) of the larger diameter portion 15, also across the small gap 25.

The radially outer, tip end portions of the first and second stators 32, 33 are formed with cut-outs 35, 36, in a comb like teeth shape respectively, thus forming a stationary cutout section. The pitch (central angle pitch) of the cut-outs 31 formed in the larger diameter portion 15 of the tone wheel 13 is made the same as that of the respective cut-outs 35, 36. Moreover, the phases of the cut-outs 35, 36 formed in the first and second stators 32, 33 are made the same.

A coil 24 is provided in the region surrounded by the outer peripheral face of the permanent magnet 22, and the respective side faces of the first and second stators 32, 33.

A voltage which changes with a frequency proportional to the rotational speed of the tone wheel 13 is produced in the coil 24 depending on the change in the density of the magnetic flux flowing in the permanent magnet 22, first stator 32 and second stator 33.

The end opening portion of the outer ring member 8 of the rolling bearing unit extends as far as the region around the nut 7 further than the attachment portion 9 fixedly provided on the outer peripheral face of the outer ring member 8.

The cover 18 closing the axially inner open end of the outer ring member 8 is made simple in shape, for minimum amount of deformation of the metal plate, and the connector 30 is axially projected from the cover 18. A cylindrical engaging portion 44 is formed around an outer peripheral face portion of the cover 18, so that the engaging portion 44 is fitted into the outer ring member 8 with an interference fit, so that the cover 18 is fixed to the axially inner open end of the outer ring member 8.

In the rolling bearing unit with rotating speed sensor as constructed above, the larger diameter portion 15 of the tone wheel 13 faced to the outer peripheral face of the sensor 20 can have a larger peripheral speed to increase the output of the sensor 20.

In addition, there is no need of enlarging the diameter of the coil 24 of the sensor 20, with the total length of the conductive wire of the coil 24 kept minimum, so that the output decrease due to the increase of resistance in the conductive wire is prevented. In the construction of FIG. 3, as the tone wheel 13 rotates, the magnetic resistance is changed simultaneously at two locations between the outer peripheral face of the first stator 32 and the inner peripheral face of the larger diameter 15, and between the outer peripheral face of the second stator 33 and the inner peripheral face of the larger diameter portion 15. Accordingly, the change in magnetic resistance is large as the tone wheel 13 rotates, so that the output of the sensor 20 is increased.

With the speed sensing rolling bearing unit fitted with an annular shape sensor 20 having the beforementioned conventional construction, or the abovementioned construction related to the previous invention in the copending JP Patent Applications, the assembly operation is difficult compared to the speed sensing rolling bearing unit fitted with a simple rod shape sensor such as has been commonly used in the past. The reason for this is that there is only a small difference between the diameter of the peripheral face of the sensor 20 and the diameter of the peripheral face of the tone wheel 13 facing the sensor 20. That is to say, irrespective of the construction, in order to adequately increase the output of the sensor 20, the small gap 25 between the sensor 20 and the tone wheel 13 must be made very small. In general the radial dimension of the small gap 25 is made less than 1 mm (for example 0.5 mm).

At the time of assembling the speed sensing rolling bearing unit, the tone wheel 13 is externally secured to the inner ring member 5 of the preassembled rolling bearing unit, after which a cover 18 containing a synthetic resin block 21 in which a sensor 20 has been embedded beforehand, is engagingly secured to the open end portion of the outer ring member 8. At the time of this engaging and securing operation, if the central axis of the tone wheel 13 and the central axis of the cover 18 are not aligned to each other, then the sensor 20 and the tone wheel 13 cannot be overlapped diametrically correctly. More specifically, in the case wherein the central axes are misaligned radially, or are inclined to each other, then with the engaging and securing operation, the sensor 20 (or rather the synthetic resin block 21 in which it is embedded) and the tone wheel 13 bump hard against each other so that the respective members 20 (21), 13 become damaged, and the attachment location of the tone wheel 13 becomes displaced from the specified location.

If either of the sensor 20 (synthetic resin block 21) or the tone wheel 13 becomes damaged, and also if the attachment location of the tone wheel 13 is displaced, then rotational speed detection of the wheel cannot be carried out correctly.

SUMMARY OF THE INVENTION

The speed sensing rolling bearing unit according to the present invention has been developed in view of the above situation.

An object of the present invention is to provide a rolling bearing unit with rotating speed sensor which has a guide to make the tone wheel and sensor overlapped radially with each other.

Another object of the present invention is to provide a rolling bearing unit with rotating speed sensor comprising outer and inner ring members, a plurality of rolling elements between the outer and inner ring members and a cover which has an engaging portion fitted to the outer ring member such that the engaging portion comprises a base half portion fitted to the outer ring member with an interference fit and a tip half portion loosely fitted to the outer ring member.

DETAILED DESCRIPTION OF THE PREFERRED EMBODIMENT

Figure 1:
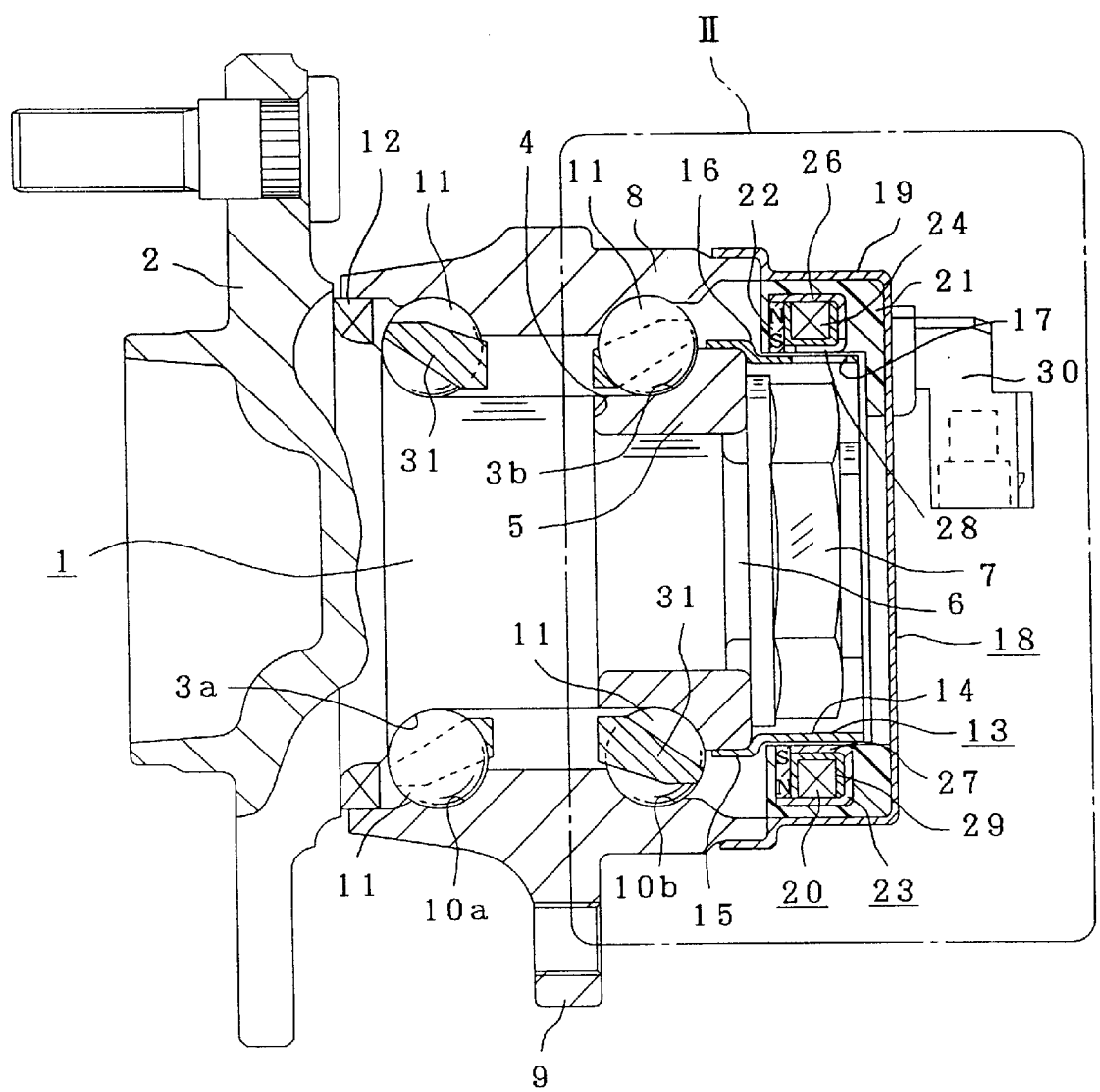
FIG. 1 is a partly cut-away, cross sectional view of an example of the prior art rolling bearing unit with rotating speed sensor.

The speed sensing rolling bearing unit according to the present invention, as with the beforementioned conventional unit and the previous invention in the copending JP Patent Applications, comprises an outer ring member which does not rotate during use, having an outer ring raceway on an inner peripheral face thereof, an inner ring member which rotates during use, having an inner ring raceway on an outer peripheral face thereof, a plurality of rolling elements provided so as to be freely rotatable between the outer ring raceway and the inner ring raceway, an annular or cylindrical magnetic tone wheel secured to an end portion of the inner ring member and having a cutout section having a peripheral portion formed with rotating cutouts circumferentially with a uniform space therebetween, a cover comprising a synthetic resin block and a metal portion and having a cylindrical engaging portion, which is fixed to an open end portion of the outer ring member by engaging the engaging portion with a peripheral face of the open end portion of the outer ring member, and an annular sensor embedded in the synthetic resin block such that a peripheral face thereof opposes a peripheral face of part of the tone wheel.

In one feature of the present invention, on the peripheral face of a tip portion of the tone wheel and/or on the peripheral face of the tip portion of the sensor, a guide is provided to make the tone wheel and sensor overlapped radially with each other.

In another feature with the speed sensing rolling bearing unit of the present invention, the peripheral portion of the engaging portion of the cover faced to the peripheral face of the open end portion of the outer ring member has different diameters at the tip half portion and base half portion. The tip half portion is loosely fitted to the peripheral face of the open end portion while the base half portion is fitted to the peripheral face of the open end portion with an interference fit.

In another feature with the speed sensing rolling bearing unit of the present invention, there is provision for the following requirements (1) and (2):

(1) Of the peripheral faces of the engaging portion of the cover, the peripheral face portion which opposes the open end peripheral face of the outer ring member differs in diameter between the tip half portion and the base half portion, so that the tip half portion loosely engages with the peripheral face of the open end portion, while the base half portion engages with an interference fit with the peripheral face of the open end portion.

(2) With $\Delta_1$ as the difference between the diameter of the peripheral face of the tip half portion of the cover and the diameter of the peripheral face of the open end portion of the outer ring member, and $\Delta_2$ as the difference between the diameter of the peripheral face of the cutout section of the tone wheel and the diameter of the peripheral face of the sensor, $L_1$ as the axial length of the engaging portion, $L_2$ as the length that the cutout section of the tone wheel axially overlaps a portion on the peripheral face of the sensor excluding the end chamfer portion of the sensor, and $L_3$ as the axial length that the end portion of the engaging portion protrudes from the end of the portion on the peripheral face of the sensor excluding the chamfer portion of the sensor, and "c" as the axial length of a chamfer portion formed on the rim portion of the peripheral face of the open end portion of the outer ring member, then $L_1-L_2-c>0$. Moreover, $|\{L_3-(L_1-L_2-c)/2\}\times\{\Delta_1/(L_1-L_2-c)\}|<\Delta_2/2$.

The operation of the speed sensing rolling bearing unit according to the present invention as described above which is rotatably supported on the suspension unit of a vehicle, at the time of detecting the rotational speed of the wheel, is the same as for the case of the beforementioned conventional construction, or the construction related to the previous invention in the copending JP Patent Applications.

In particular, with the speed sensing rolling bearing unit of the present invention, the operation of concentrically assembling the sensor and the tone wheel is easily carried out, so that there is substantially no displacement of the attachment location of the tone wheel nor damage to the sensor and the tone wheel.

In the rolling bearing unit with rotating speed sensor according to the one feature of the present invention, disposed on at least one of the peripheral face of the tip end portion of the tone wheel and the peripheral face of the tip end portion of the sensor is a guide by which the tone wheel and sensor are overlapped easily with each other.

In the second feature of the present invention, the centering of the tone wheel and the sensor is carried out with the tip half portion of the peripheral face of the engaging portion of the cover loosely engaged with the peripheral face of the open end portion of the outer ring member. Specifically, the tip half portion of the cover can be used as a guide for aligning the central axis of the outer ring member and the central axis of the cover.

Since at the time of this centering operation, it is not necessary to press hard on the cover, then the delicate positioning of the cover can be easily carried out.

If after loosely engaging the tip half portion of the cover with the inner peripheral face of the open end portion of the outer ring member to center the tone wheel and the sensor, the cover is pressed strongly towards the outer ring member, then the cover can be securely fixed relative to the outer ring member. At this time, there is no possibility of bumping of the tone wheel and the sensor.

In particular in the second feature with the speed sensing rolling bearing unit of the present invention, since the dimensional relationship of the respective portions is made $L_1-L_2-c>0$, then the tip half portion of the cover engages with the inner peripheral face of the outer ring member further inside than the chamfer portion of the outer ring member, before the portion on the peripheral face of the sensor excluding the end chamfer portion of the sensor is advanced into the tone wheel. The centering of the outer ring member and the cover is thus achieved by means of the tip half portion, thus effectively preventing collision of the sensor and tone wheel. However, with the tip half portion only loosely engaged with the peripheral face of the open end portion, then the cover and the sensor supported thereinside, can become axially inclined. If the inclination is large, and the engagement operation is proceeded as is, there is the likelihood of the sensor and the tone wheel colliding. In the case of the present invention however, since the dimensional relationship between the respective portions is made $|\{L_3-(L_1-L_2-c)/2)\}\times\{\Delta_1/(L_1-L_2-c)\}|<\Delta_2 2$, then the cover cannot become inclined to the outer ring member to the extent that the sensor and the tone wheel collide.

Figure 4:
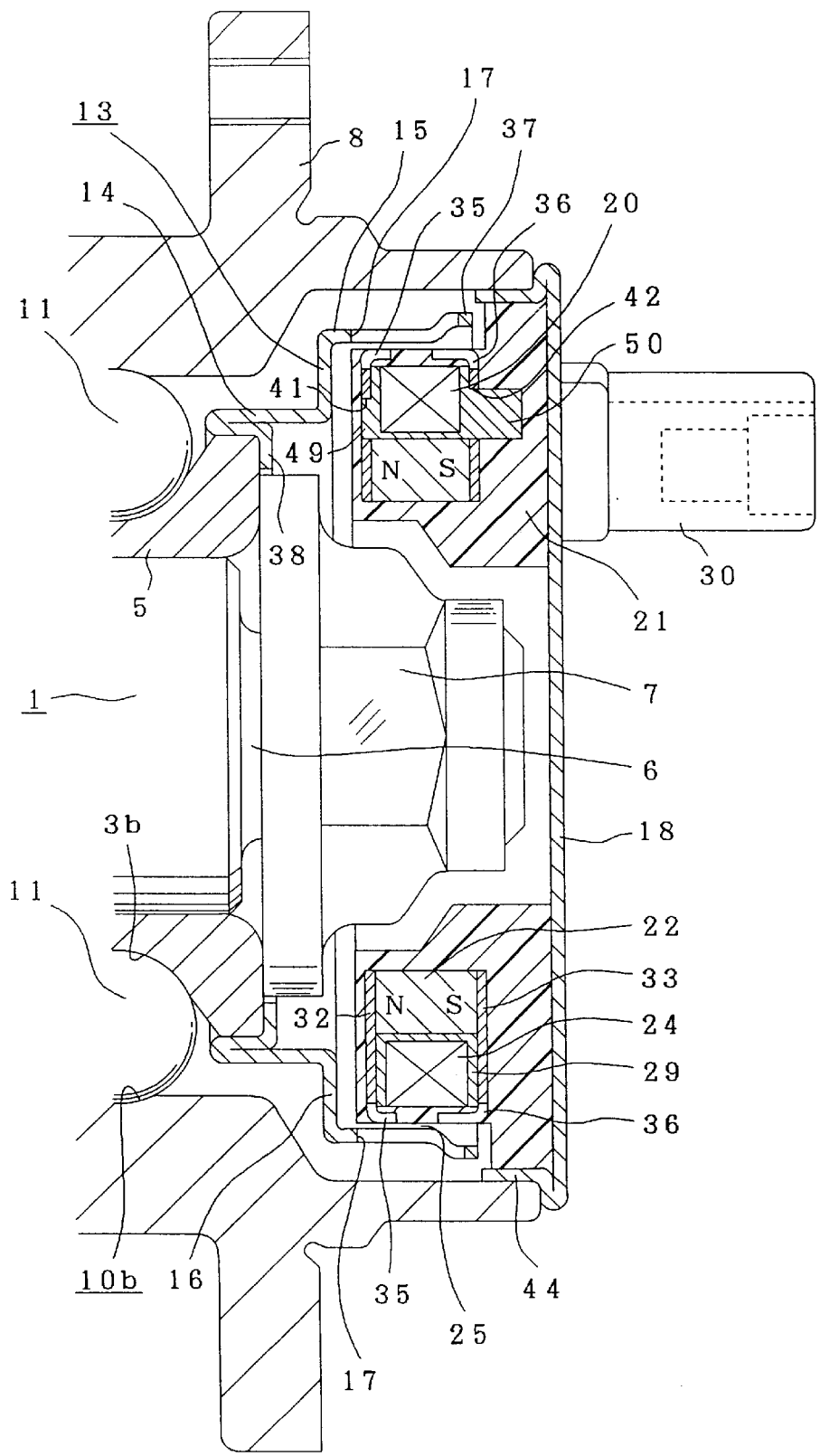
FIG. 4 is a partly cut-away cross sectional view of an embodiment of the rolling bearing unit with rotating speed sensor of according to the present invention.

FIG. 4 shows a first embodiment of the present invention.

A feature of the speed sensing rolling bearing unit of the present invention is the simplification of the operation of concentrically assembling a sensor 20 and a tone wheel 13, thereby preventing displacement of the attachment location of the tone wheel 13, and damage to the sensor 20 (or rather a synthetic resin block 21 in which it is embedded) and the tone wheel 13.

With regards to the construction of the rolling bearing unit, this is the substantially same as for the beforementioned conventional construction, while the construction of the sensor 20 is substantially the same as that for the aforementioned previous invention in the copending JP Patent Applications.

Therefore with the portions of rolling bearing unit and the sensor 20, the like symbols are used for the like portions and repeated description is omitted or abbreviated. As follows is a description centered on the portion of the tone wheel 13 which is provided with a guide 37, being the feature of the present invention.

The tone wheel 13 is made in an overall annular shape (cylindrical shape) of crank shape in cross section by plastic working, for example deep drawing or press forming, a magnetic metal plate such as steel. The tone wheel 13 comprises a smaller diameter portion 14 serving as a cylindrical fixing portion, a larger diameter portion 15 serving as a cylindrical detection portion, and a stepped portion 16 connecting the edge portions of the smaller diameter portion 14 and the larger diameter portion 15.

In particular, in the case of the tone wheel 13 of the speed sensing rolling bearing unit of the present embodiment, an axially inner tip portion of the larger diameter portion 15 is further enlarged in diameter, with this increased diameter portion connected to the other portion by an inclined portion, forming a ramp shape guide 37.

The inner diameter of the substantial portion excluding the guide 37 of the large diameter portion 15 is made slightly larger than the outer diameter of the sensor 20 so that a very small gap 25 with a radial width of 1 mm or less is formed between the inner peripheral face of the larger diameter portion 15 and the outer peripheral face of the sensor 20.

Furthermore, the inner diameter of an opening portion of the guide 37 is made sufficiently larger than the outer diameter of the sensor 20 so that the sensor 20 can be easily inserted into the opening portion of the guide 37. A rotating cutout section formed on the larger diameter portion 15, comprises axially aligned long rectangular slots 17. With this structure of the cutout section, the guide 37 at the opening portion is made continuous around the whole periphery to thereby ensure the rigidity of the opening portion.

With the speed sensing rolling bearing unit according to the present invention constructed as described above, the operation of concentrically assembling the sensor 20 and the tone wheel 13 can be easily carried out so that there is no displacement of the attachment location of the tone wheel 13, and damage to the sensor 20 (or rather the synthetic resin block 21 in which it is embedded) and the tone wheel 13. That is to say, due to the ramp shape of the guide 37 formed on the axially inner tip portion of the tone wheel 13, then the synthetic resin block 21 in which the sensor 20 is embedded, can be easily inserted inside the larger diameter portion 15 of the tone wheel 13, so that the operation of diametrically overlapping the tone wheel 13 and the sensor 20 can be easily carried out. Consequently, during the operation of concentrically assembling the sensor 20 and the tone wheel 13, damage to the sensor 20 (or rather a synthetic resin block 21 in which it is embedded) and to the tone wheel 13, and displacement of the attachment location of the tone wheel 13 is avoided.

In particular, with the embodiment shown in the figure, a part of the metal plate of the tone wheel 13 is bent back through 180 degrees at the rim portion closer to the smaller diameter portion 14, after which the tip is bent through 90 degrees in the radial inwards direction to give an inward facing flange shaped brim 38. In supporting the tone wheel 13 on the inner ring member 5, the smaller diameter portion 14 is pressed onto the end portion of the inner ring member 5 until the axially outer side face of the brim 38 is abutted against the axially inner end face of the inner ring member 5. Since the tone wheel 13 including the brim 38 is produced according to the manufacturing specification for products to have the same shape and dimensions, then the tone wheel 13 can be located relative to the inner ring member 5, by simply abutting the axially outer side face of the brim 38 against the axially inner end face of the inner ring member 5 in the abovementioned manner.

After fitting the tone wheel 13 to the inner ring member 5 in this way, then even if other members such as the cover 18 are bumped against the tone wheel 13, there is no displacement of the tone wheel 13 from its attachment location. At the time of pressing the smaller diameter portion 14 onto the end portion of the inner ring member 5, if the press face of an insertion tool is abutted against the axially inner side face (the right side face in FIG. 4) of the brim 38, then the pressing operation can be carried out without damage to the tone wheel 13.

Furthermore, by finishing off the axially outer side face of the brim 38 at right angles to the central axis of the tone wheel 13, then the precision with reference to whirling of the tone wheel 13 can be ensured. That is to say, the axially outer side face is formed accurately at right angles to the central axis easily by adjustment of the plastic working apparatus. Moreover, the plane through the outer peripheral rim of the axially inner end face of the inner ring member 5 is formed perpendicular to the central axis of the inner ring member 5, easily by adjustment of the apparatus for manufacturing the inner ring member 5. Practically, the end face of the inner ring member 5 is accurately made at right angles with respect to its central axis. Therefore, if the perpendicularity of both portions is ensured, then with the axially outer side face of the brim 38 abutted against the axially inner end face of the inner ring member 5, the central axis of the tone wheel 13 and the central axis of the inner ring member 5 will accurately coincide. Consequently, the situation is prevented such that the larger diameter portion 15 of the tone wheel 13 whirls, specifically that the peripheral face of the larger diameter portion 15 of the tone wheel 13 is displaced in the radial direction with rotation of the inner ring member 5, and hence the output from the sensor 20 is stabilized.

With the embodiment shown in the figure, both the inner and outer side faces of the bobbin 29 for the coil 24 of the sensor 20 are each formed with at least one protrusion 49, 50 respectively. These protrusions 49, 50 are respectively inserted into apertures 41, 42 formed in first and second stators 32, 33 respectively. Through engagement of the protrusions 49, 50 with the apertures 41, 42, the phases of cut-outs 35, 36 formed in the first and second stators 32, 33 are made to coincide. An end of the conductive wire wound onto the bobbin 29 to form the coil 24, is taken out through the protrusion 50 formed on the axially inner side face of the bobbin 29, and connected to a terminal of a connector 30 secured to the axially with the inner side face of the cover 18.

With this embodiment, the guide 37 provided on the tip portion of the tone wheel 13 is formed by a rim portion continuous in the circumferential direction. With the rim portion, the tone wheel is perforated in a window shape instead of the comb teeth shape, so that the processing is easy with the rigidity of the tone wheel increased. The distance of the rim portion from the outer peripheral face of the second stator 33 is made sufficiently large. Consequently there is practically no magnetic flux flow from the second stator 33 to the rim portion. In particular, since the amount of change of the magnetic flux is not diminished due to the existence of the rim portion, then the output of the sensor 20 can be fully maintained.

Figure 5:
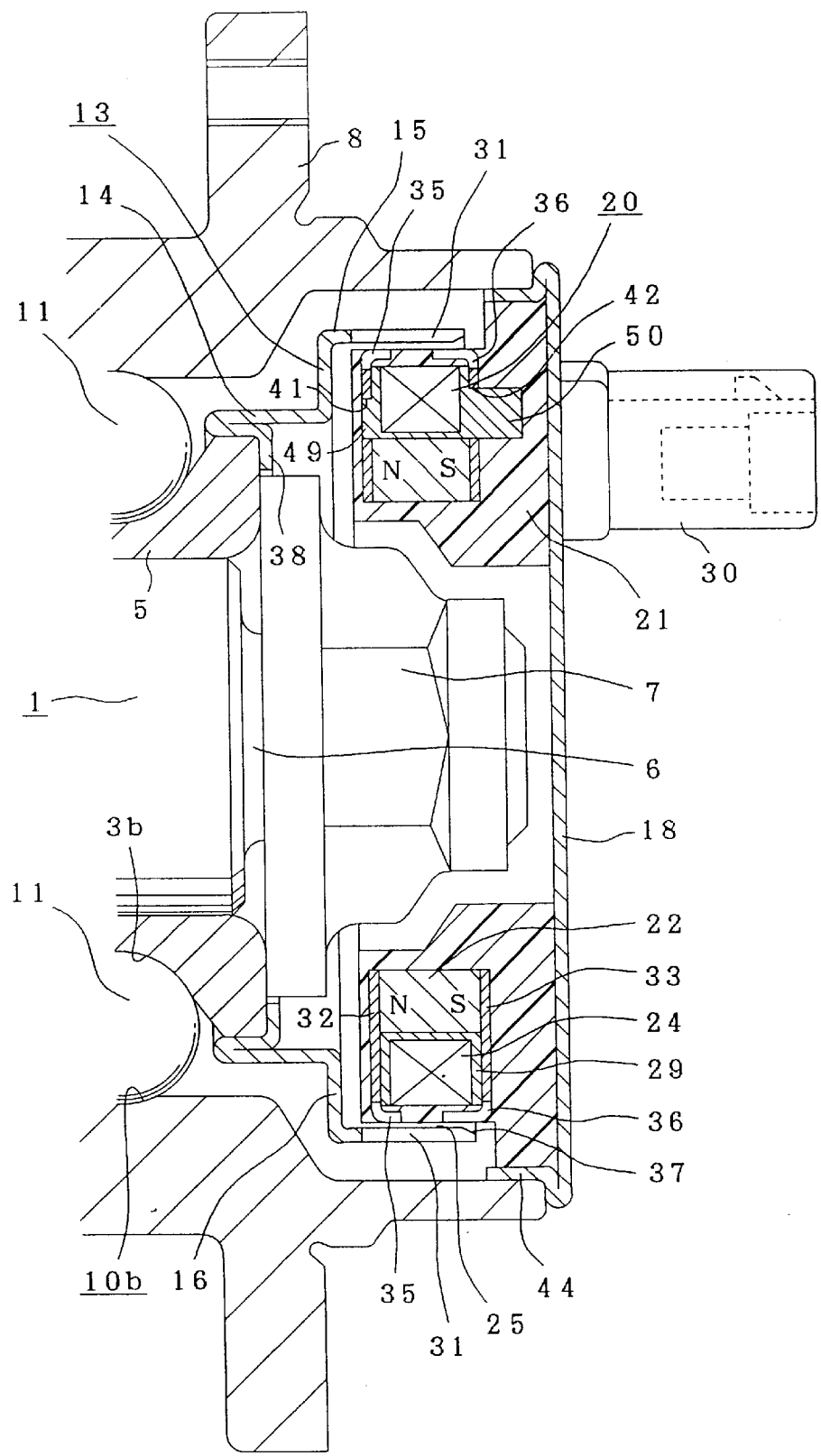
FIG. 5 is a partly cut-away cross sectional view of another embodiment of the rolling bearing unit with rotating speed sensor of according to the present invention.

FIG. 5 shows a second embodiment of the present invention. With this embodiment, an inclined face of bowl rim shape is formed on an inner peripheral face of the rim portion of the larger diameter portion 15 of a tone wheel 13, by a plastic working process such as face pressing, or by machining and the like, to give a guide 37 for guiding insertion of the sensor 20 (or rather the synthetic resin block 21 in which it is embedded) inside the larger diameter portion 15. With this embodiment, the rotating cutout section formed on the larger diameter portion 15 is made by cut-outs 31, and the large diameter portion 15 thus formed in a comb like shape. Other details of the construction and operation are substantially the same as for the abovementioned first embodiment.

Figure 6:
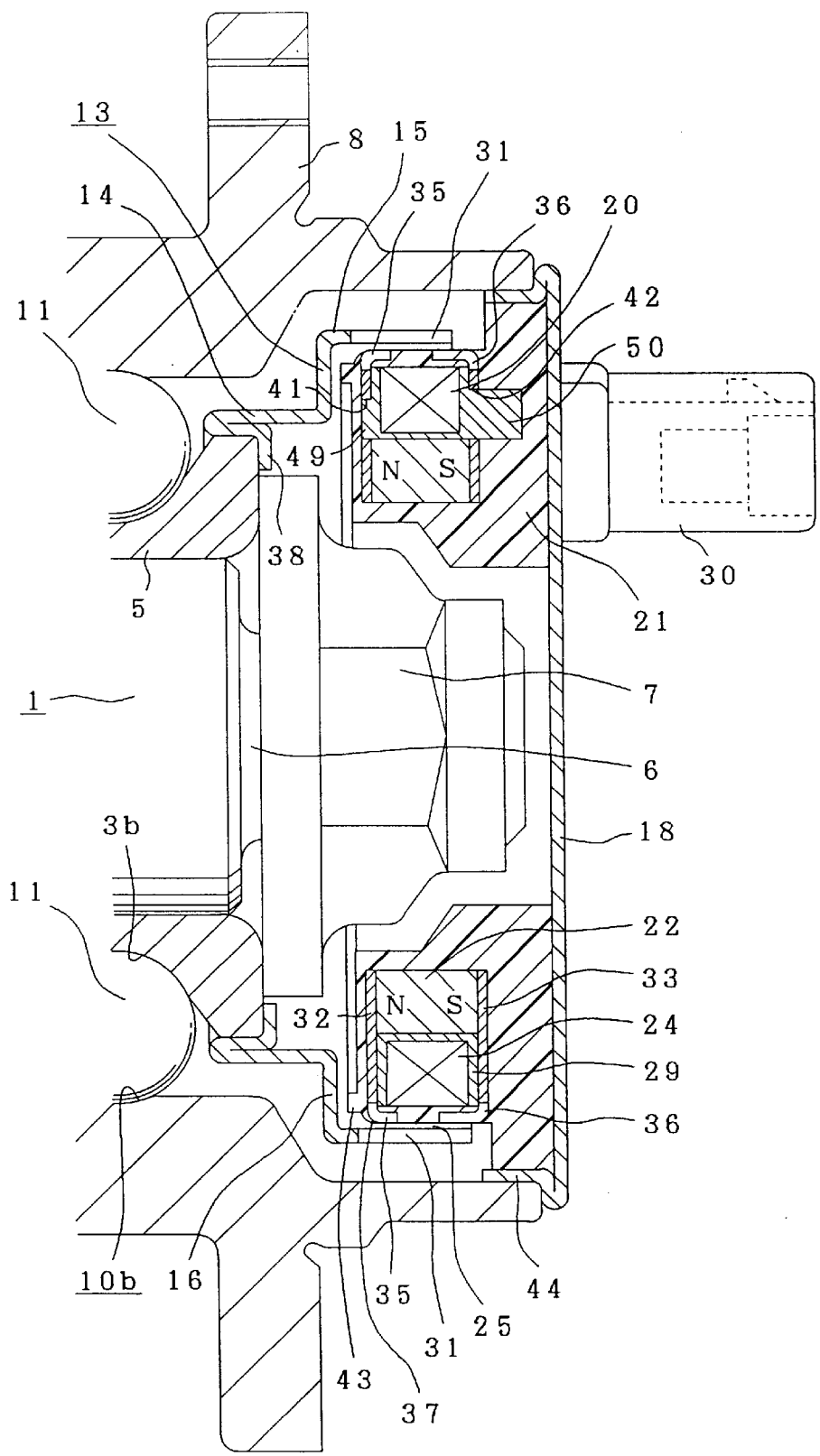
FIG. 6 is a partly cut-away cross sectional view of another embodiment of the rolling bearing unit with rotating speed sensor of according to the present invention.

FIG. 6 shows a third embodiment of the present invention. With this embodiment, an annular protrusion 43 is formed on the axially outer end face (the left end face in FIG. 3) of the synthetic resin block 21 in which the sensor 20 is embedded, around the whole periphery at a location slightly radially inwards from the outer peripheral face of the synthetic resin block 21 (and the sensor 20 which is embedded in the synthetic resin body 21). The outer peripheral face of the protrusion 43 is smoothly connected to the outer peripheral face of the synthetic resin block 21, to form a guide 37. At the time of concentrically assembling the sensor 20 and the tone wheel 13, due to the guide 37, the synthetic resin block 21 in which the sensor 20 is embedded, can be easily inserted inside the larger diameter portion 15 of the tone wheel 13, so that the operation of diametrically overlapping the tone wheel 13 and the sensor 20 can be easily carried out. If the outer peripheral face of the protrusion 43 is formed with a taper with the outer diameter decreasing towards the tip, then the operation can be even further simplified. Other details of the construction and operation are the same as for the construction of the beforementioned previous invention.

Figure 7:
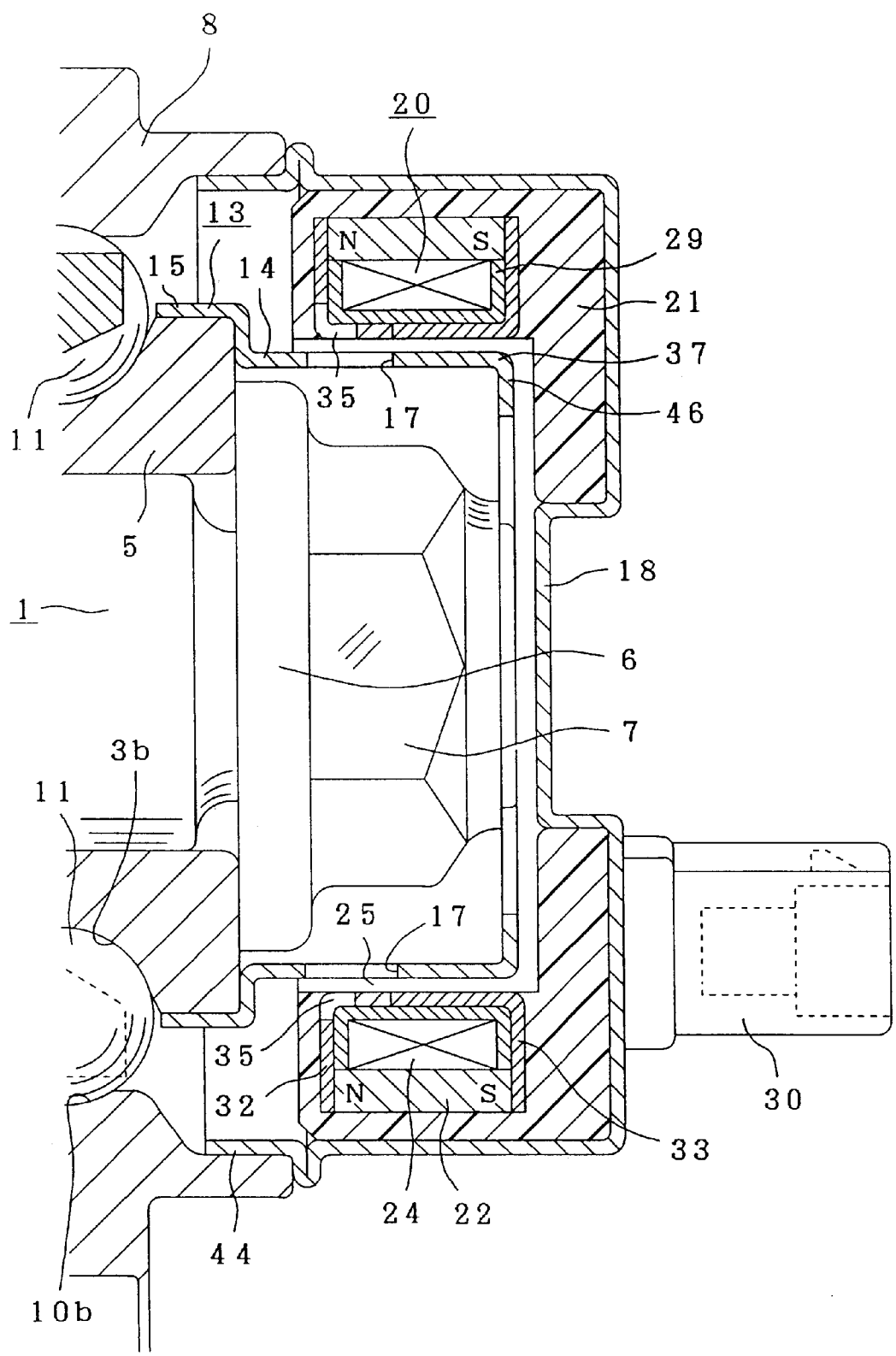
FIG. 7 is a partly cut-away cross sectional view of another embodiment of the rolling bearing unit with rotating speed sensor of according to the present invention.

FIG. 7 shows a fourth embodiment of the present invention. With this embodiment, a plurality of apertures 17 in the rotating cutout section, are formed at even spacing around the circumferential direction on a base half portion (left half portion in FIG. 7) of a smaller diameter portion 14 of a tone wheel 13. A radially inwards bent brim 46 is formed on the tip end rim of the smaller diameter portion 14. The brim 46 and the smaller diameter portion 14 are connected by a curved corner portion of a quadrant shape in cross section.

With this embodiment, the curved corner portion functions as a guide 37. That is to say, the curved corner portion functions as a guide 37 at the time of inserting the smaller diameter portion 14 inside a sensor 20, thus facilitating the insertion operation of a cover 18. The brim 46 forms the curved portion 47 functioning in this way as a guide, simplifies the manufacture of the tone wheel 13, and also improves rigidity.

The sensor 20 has first and second stators 32, 33. Cut-outs 35 in the stationary cutout portion, are formed only on an inner peripheral rim of the first stator 32. The cut-outs 35 oppose a cutout section of the base half portion of the smaller diameter portion 14 which is formed with apertures 17, with the pitch of the cut-outs 35 and of the apertures 17 equal. An inner peripheral rim of the second stator 33 opposes a part of the tip half portion of the smaller diameter portion 14 where the apertures 17 are not formed. Consequently, the second stator 33 merely serves the role of carrying the magnetic flux. Other details of the construction and operation are the same as for the abovementioned respective working examples.

Figure 8:
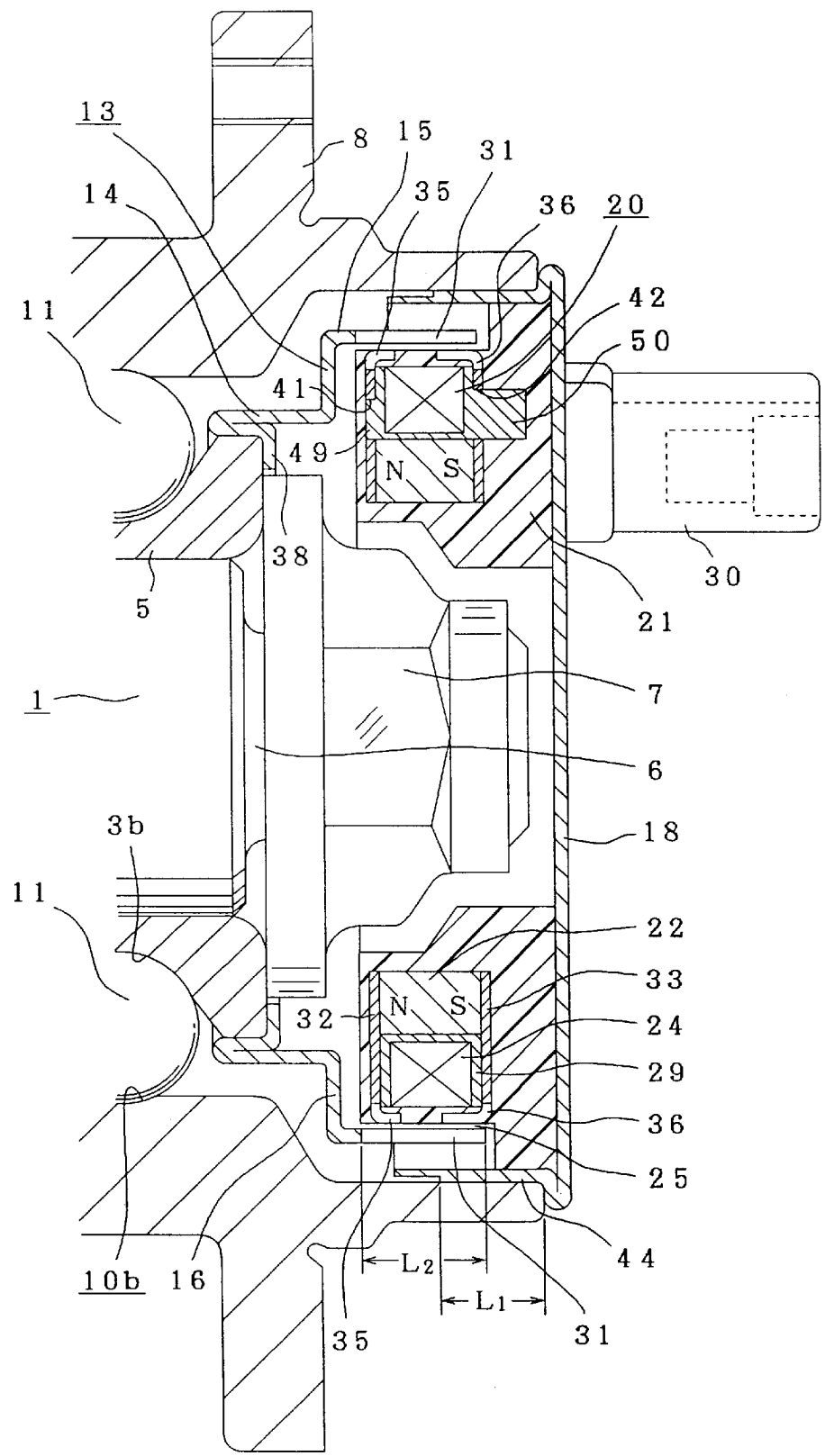
FIG. 8 is a partly cut-away cross sectional view of another embodiment of the rolling bearing unit with rotating speed sensor of according to the present invention.

FIG. 8 shows a fifth embodiment of the present invention. With this embodiment, the engaging portion 44 has a thin tip half portion. Specifically, an axial length of the engaging portion 44 formed on a portion near an outer peripheral face of the cover 18, for engagingly securing the cover 18 to the open end portion of the outer ring member 8, is made axially longer than the engaging portion 44 of the beforementioned previous invention and of the abovementioned first through third working examples. Furthermore, the outer diameter of the outer peripheral face of the engaging portion 44 is made different at the tip half portion and the base half portion. That is to say, the outer diameter of the tip half portion is made slightly less than the inner diameter of the open end portion of the outer ring member 8, so as to engage loosely with the open end portion. On the other hand, the outer diameter of the base half portion in the free condition, is made slightly larger than the inner diameter of the open end portion of the outer ring member 8, so as to engage with an interference fit with the open end portion.

With this embodiment, the centering of the tone wheel 13 and the sensor 20 is carried out with the tip half portion of the peripheral face of the engaging portion 44 loosely engaged with the peripheral face of the open end portion of the outer ring member 8. Since at the time of this centering operation, it is not necessary to press hard on the cover 18, then not only can delicate positioning of the cover 18 be easily carried out, but also, even if the sensor 20 (or rather a synthetic resin block 21 in which it is embedded) and the tone wheel 13 are bumped, there is not damage to these components.

If after loosely engaging the tip half portion with the inner peripheral face of the open end portion of the outer ring 8, to center the tone wheel 13 and the sensor 20, the cover 18 is pressed strongly towards the outer ring member 8, then the cover 18 can be securely fixed relative to the outer ring member 8 with the base half portion of the engaging portion 44 internally engaged with an interference fit with the inner peripheral face of the open end portion of the outer ring member 8.

When internally engaging the base half portion with the inner peripheral face of the open end portion in this way, since centering of the tone wheel 13 and the sensor 20 has already been carried out, then there is no possibility of bumping of the tone wheel 13 and the sensor 20. In particular with the embodiment shown in the figure, in order to more reliably achieve this purpose, the length L1 of the interference fit of the engaging portion 44 is made longer than the length $L_2$ of the overlap of the tip end face of the synthetic resin body 21 and the end rim of the tone wheel 13 ($L_1 > L_2$). Consequently, in the state where the tip half portion is loosely engaged with the inner peripheral face of the open end portion of the outer ring member 8, there is no bumping of the tip end face of the synthetic resin block 21 with the end rim of the tone wheel 13.

Figure 9:
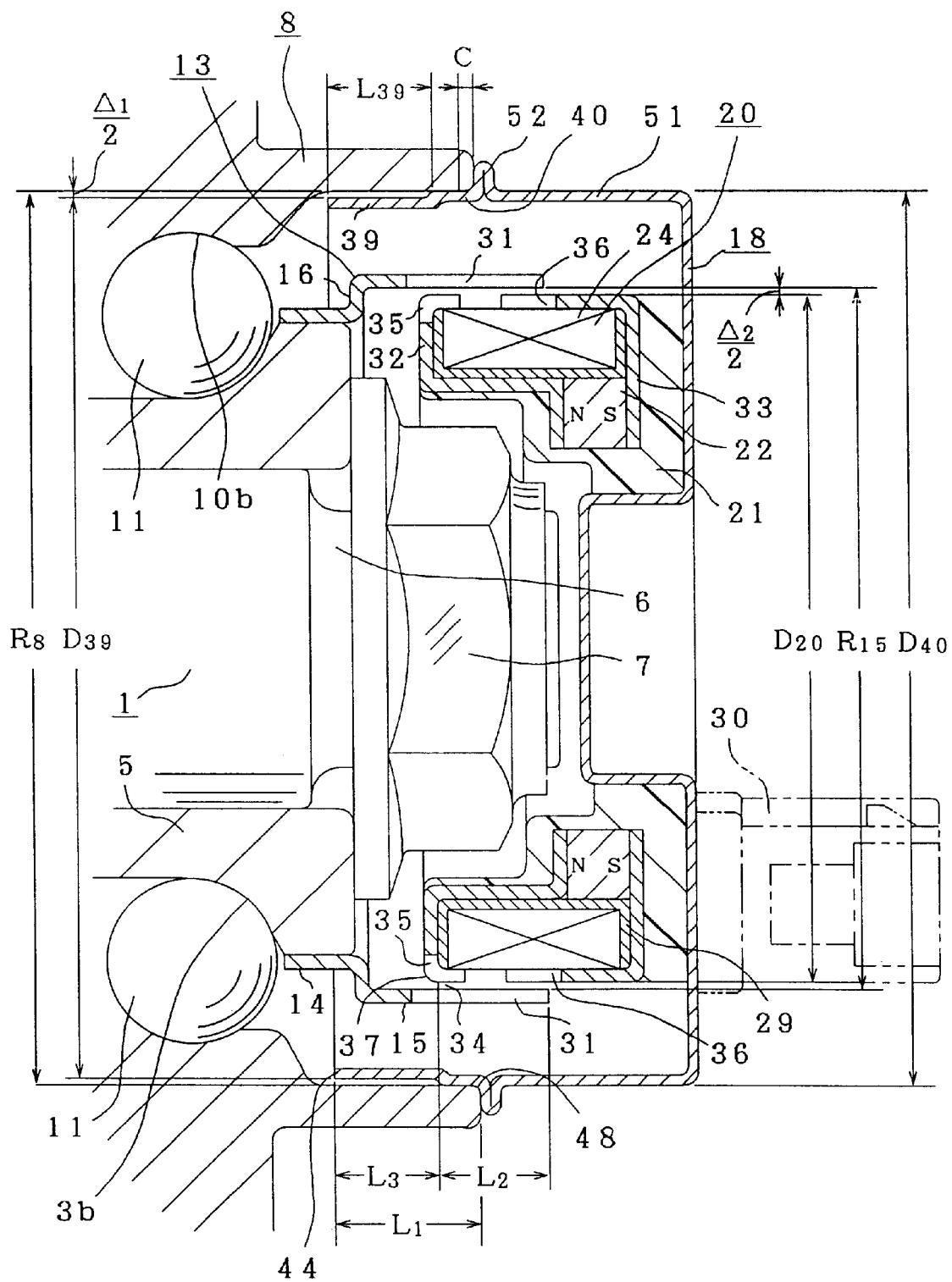
FIG. 9 is a partly cut-away cross sectional view of another embodiment of the rolling bearing unit with rotating speed sensor of according to the present invention.

FIG. 9 shows another embodiment of the present invention. As follows is a description centered on the characterizing portions of the embodiment. For clarity, dimensions ($\Delta_1$, $\Delta_2$ etc.) such as for the radial gap are drawn larger than the actual case.

The axial length L1 of an engaging portion 44 formed on a portion of the cover 18 on the outer periphery thereof, for engagingly securing the cover 18 to the open end portion of the outer ring member 8, is made longer than the length necessary for actually securing the cover 18 to the outer ring member 8. That is to say, with the embodiment shown in the figure, an outwardly flanged brim 52 is formed on the outer peripheral face of a central portion of a cylindrical portion 51 of the cover 18, and the engaging portion 44 is made on the part of the cylindrical portion 51 nearer to the tip half than the brim 52 (the portion to the left in FIG. 9). The outer diameter of the outer peripheral face of the engaging portion 44 is made different at the tip half portion 39 and the base half portion 40. That is to say, the outer diameter $D_{39}$ of the tip half portion is made slightly smaller (by $\Delta_1$ as discussed hereafter) ($D_{39} < R_8$) than the inner diameter $R_8$ of the portion on the open end portion of the outer ring member 8 further inside than the chamfer portion 48 (left side portion in FIG. 9). Consequently the tip half portion 39 is loosely engaged with the open end portion. On the other hand, the outer diameter $D_{40}$ of the base half portion 40 in the free condition, is made slightly larger than the inner diameter $R_8$ of the open end portion of the outer ring 8 ($D_{40} > R_8$), so that the base half portion 40 engages with the open end portion with an interference fit.

With the speed sensing rolling bearing unit of the present embodiment, the dimensions of the constituent parts are specified so as to satisfy the following equations (1) and (2):

$$L_1 - L_2 - c > 0 \tag{1}$$

$$|\{(L_3 - (L_1 - L_2 - c)/2\} \times \{\Delta_1/(L_1 - L_2 - c)\}| < \Delta_2/2 \tag{2}$$

The symbols in the respective equations indicate the following dimension of the respective parts. $\Delta_1$: the difference between the outer diameter $D_{39}$ being the diameter of the peripheral face of the tip half portion 39, and the inner diameter $R_8$ being the diameter of the peripheral face of the open end portion of the outer ring member 8 ($R_8 - D_{39}$) $\Delta_2$: the difference between the inner diameter $R_{15}$ of the larger diameter portion 15, being the diameter of the peripheral face of the cutout section of the tone wheel 13, and the outer diameter $D_{20}$, being the diameter of the peripheral face of the sensor 20 ($R_{15} - D_{20}$)

$L_1$: the axial length of the engaging portion 44

$L_2$: the length that the cutout section of the tone wheel 13 axially overlaps the peripheral face of the sensor 20 excluding the end (left end in FIG. 9) chamfer portion 45 (portion of a quadrant shape in cross section)

$L_3$: the axial length that the end (left end in FIG. 9) of the engaging portion 44 protrudes from the end portion of the peripheral face of the sensor 20 excluding the end chamfer portion 45.

c: the axial length of the chamfer portion 48 formed on the rim portion of the peripheral face of the open end portion of the outer ring member 8.

At the time of manufacture of the speed sensing rolling bearing unit of the present invention as described above, the operation of securing the cover 18 containing the synthetic resin block 21 in which the sensor 20 is embedded, to the outer ring member 8 is carried out as follows. At first the tip half portion 39 of the peripheral face of the engaging portion 44 is loosely engaged (light engagement) with the inner peripheral face of the open end portion of the outer ring member 8. On the basis of this light engagement, the centering of the tone wheel 13 and the sensor 20 is carried out. Since at the time of this centering operation, it is not necessary to press hard on the cover 18, then the delicate positioning of the cover 18 can be easily carried out. If after loosely engaging the tip half portion 39 with the inner peripheral face of the open end portion of the outer ring member 8 to center the tone wheel 13 and the sensor 20, the cover 18 is pressed strongly towards the outer ring member 8, then the cover 18 can be securely fixed relative to the outer ring member 8, with the base half portion 40 of the peripheral face of the engaging portion 44 internally engaged with an interference fit with the inner peripheral face of the open end portion of the outer ring 8.

When internally engaging the base half portion 40 with the inner peripheral face of the open end portion in this way, since centering of the tone wheel 13 and the sensor 20 has already been carried out, then there is no possibility of bumping of the tone wheel 13 and the sensor 20.

Figure 10:
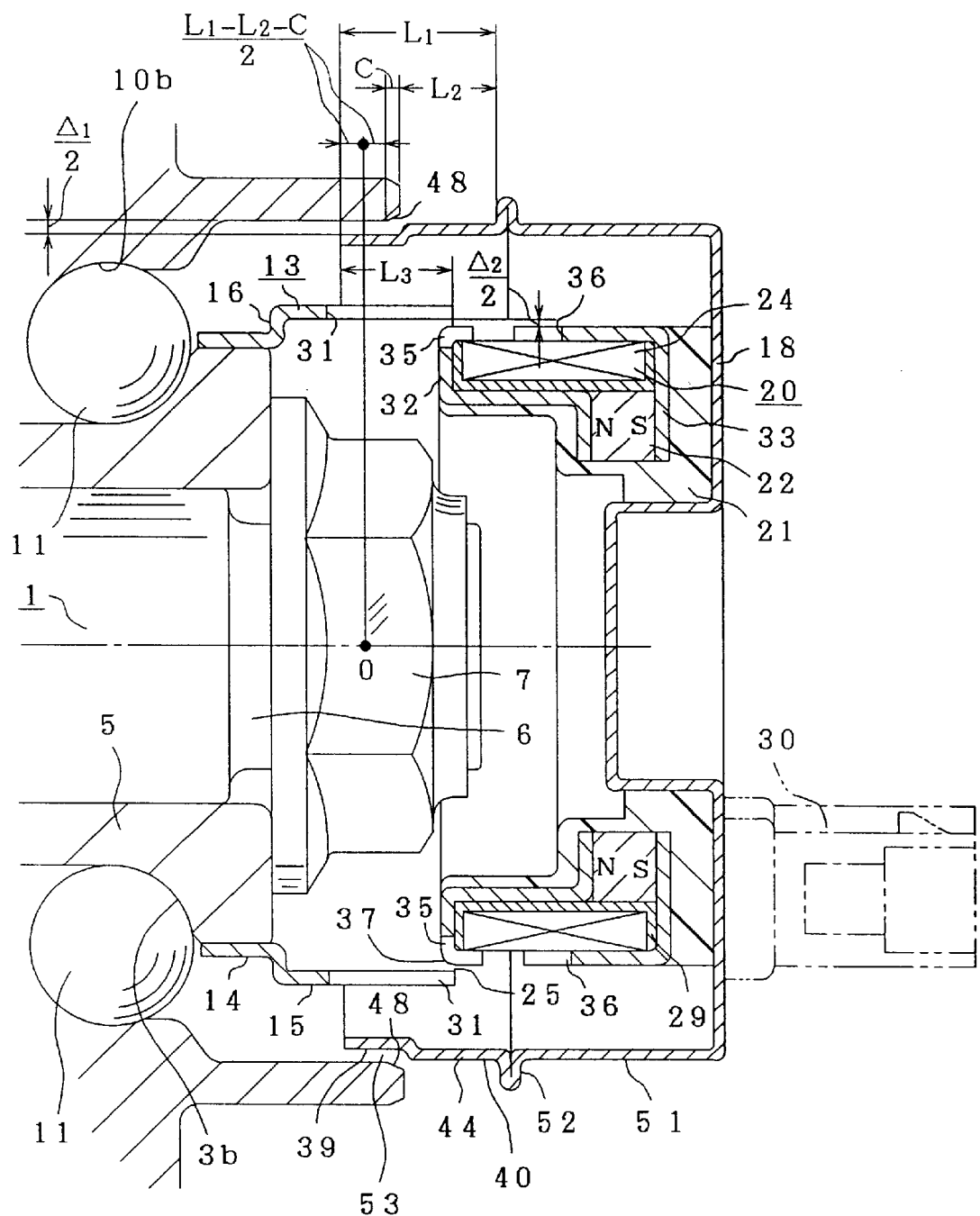
FIG. 10 is a cross sectional view of the rolling bearing unit with rotating speed sensor of FIG. 9 in the state where the cover 18 is moved away from the outer ring member 8.

In particular, with the speed sensing rolling bearing unit of the present invention, since as shown by the beforementioned equation (1), the dimensions of the respective parts are made $L_1 - L_2 - c > 0$, then as shown in FIG. 10, the tip half portion 39 engages with the inner peripheral face of the open end portion of the outer ring member 8 further inwards than the chamfer portion 48 (the left side in FIG. 10), before the constant diameter portion on the outer peripheral face of the sensor 20 is advanced into the larger diameter portion 15 of the tone wheel 13. The centering of the outer ring member 8 and the cover 18 is thus achieved by means of the tip half portion 39, thus effectively preventing collision of the sensor 20 and the tip rim (right rim in FIG. 10) of the larger diameter portion 15 of the tone wheel 13.

However, with the tip half portion 39 only loosely engaged with the inner peripheral face of the open end portion of the outer ring member 8, then the cover 18, and the sensor 20 supported thereinside by means of the synthetic resin block 21, can become axially inclined. If the inclination is large, and the engagement operation is proceeded as is, there is the likelihood of colliding between the outer peripheral rim of the end portion (the end of the portion excluding the chamfer 45) of the sensor 20, and the end rim of the larger diameter portion 15. In the case of the speed sensing rolling bearing unit of the present invention however, since the dimensional relationship between the respective portions is made $|\{L_3-(L_1-L_2-c)/2\}\times\{\Delta_1/(L_1-L_2-c)\}|<\Delta_2/2$, then the cover 18 cannot become inclined to the outer ring member 8 to the extent that the outer peripheral rim of the end portion of the sensor 20 collides with the end rim of the larger diameter portion 15 of the tone wheel 13.

This point will be explained in more detail. At first the condition is considered, as shown in FIG. 10, at the instant wherein the axially outer portion on the outer peripheral face of the sensor 20 starts to be inserted inside of the larger diameter portion 15. As is clear from FIG. 10, in this condition, the outer peripheral face of the tip half portion 39, and the inner peripheral face of the open end portion of the outer ring member 8, oppose partly each other over an axial length of $(L_1-L_2-c)$. In this condition, a small gap 53 having a width of $\Delta_1/2$ exists around the whole periphery between the outer peripheral face of the tip half portion 39 and the inner peripheral face of the open end portion of the outer ring member 8.

Here, based on the presence of the small gap 53, the cover 18 can be inclined at an angle of only "$\theta$" degrees about a central point "O" on the central axis of the outer ring member 8 and the cover 18. Furthermore, the point "O" exists on the axial center of the small gap 53. In other words, the point "O" exists on the central axis at a location axially separated from opposite ends of the small gap 53 by $(L_1-L_2-c)/2$. Since the angle "$\theta$" is small, then $\theta$ is substantially equal to $\tan\theta$. Moreover, as is clear from the above explanation, $\tan\theta=(\Delta_1/2)/\{(L_1-L_2-c)/2\}=\Delta_1/(L_1-L_2-c)$. Furthermore, as is clear from FIG. 10, based on the inclination, the amount that the end of the portion on the outer peripheral face of the sensor 20 excluding the end chamfer portion 45 can be displaced diametrically (upwards/downwards direction in FIG. 10) is $\{L_3-(L_1-L_2-c)/2\}\times\{\Delta_1/(L_1-L_2-c)\}$. To prevent collision of the end portion on outer peripheral face of the sensor 20 with the end rim of the larger diameter portion 15, then this value must be less than $\Delta_2/2$, being half of the difference between the inner diameter $R_{15}$ (FIG. 9) of the larger diameter portion 15 (the diameter of the one part peripheral face of the tone wheel 13) and the outer diameter $D_{20}$ (FIG. 9) (the diameter of the peripheral face of the sensor 20). With the speed sensing rolling bearing unit of the present invention, since $|\{L_3-(L_1-L_2-c)/2\}\times\{\Delta_1/(L_1-L_2-c)\}|<\Delta_2/2$, then the end portion on the outer peripheral face of the sensor 20 does not collide with the end rim of the larger diameter portion 15.

Figure 11:
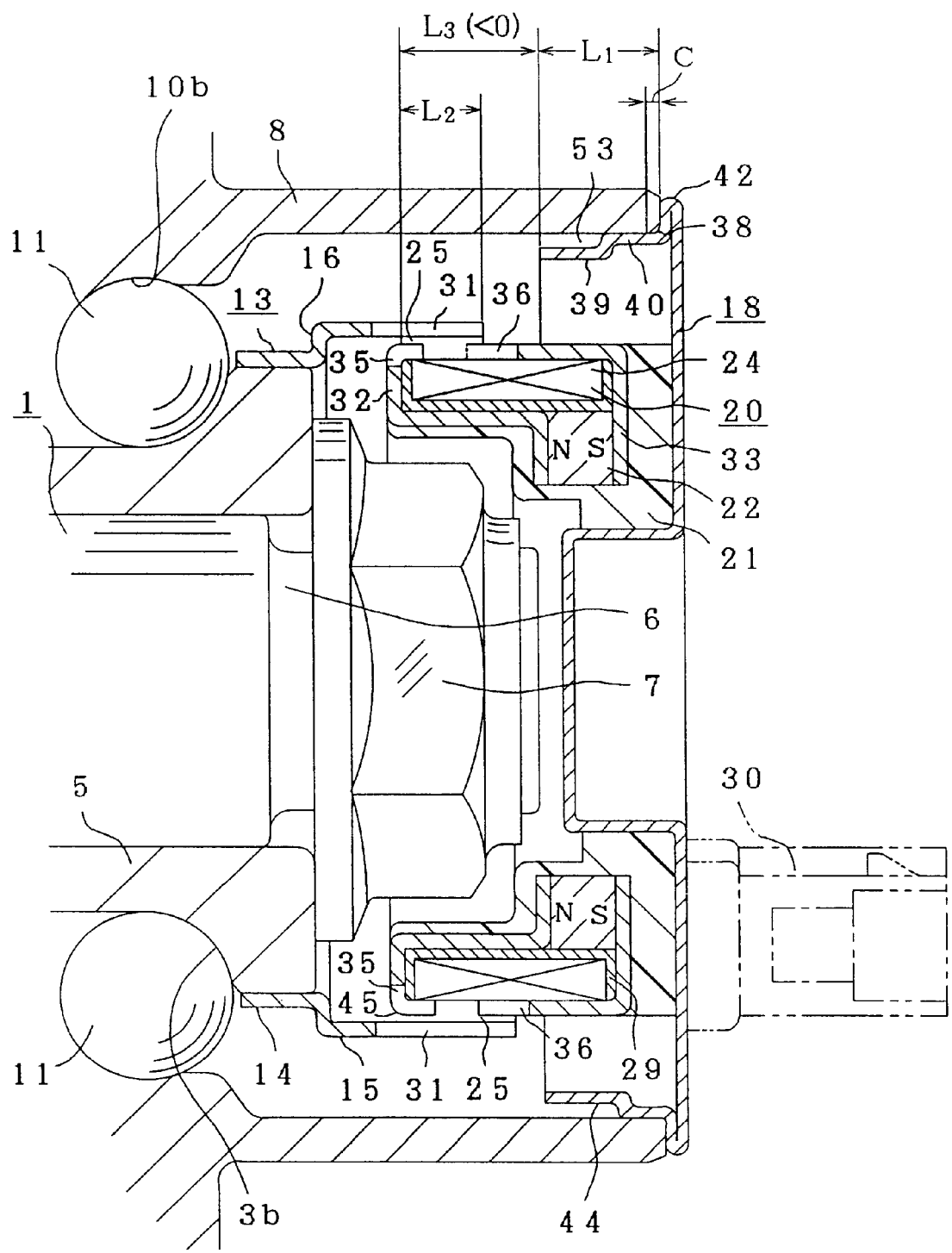
FIG. 11 is a cross sectional view of the rolling bearing unit with rotating speed sensor of an example for comparison with FIGS. 9 and 10.

The value $L_3$ is defined so as to have a positive value in the case as shown in FIG. 9, where the end of the portion on the outer peripheral face of the sensor 20 excluding the end chamfer portion 45 is located axially inwards (to the right in FIG. 9) than the end (left end in FIG. 9) of the engaging portion 44. Consequently, in the case as shown in FIG. 11, where the end of the portion on the outer peripheral face of the sensor 20 excluding the end chamfer portion 45 is located axially outwards (to the left in FIG. 11) than the end (left end in FIG. 11) of the engaging portion 44, the value $L_3$ becomes a negative value. Therefore, with the construction as shown in FIG. 11, the end of the portion on the outer peripheral face of the sensor 20 is displaced diametrically (upwards/downwards direction in FIG. 11) by an amount in length equal to the sum of the absolute value of $L_3$, and $(L_1-L_2-c)/2$. Hence the symbol for absolute value is used on the left side of equation (2).

Figure 12:
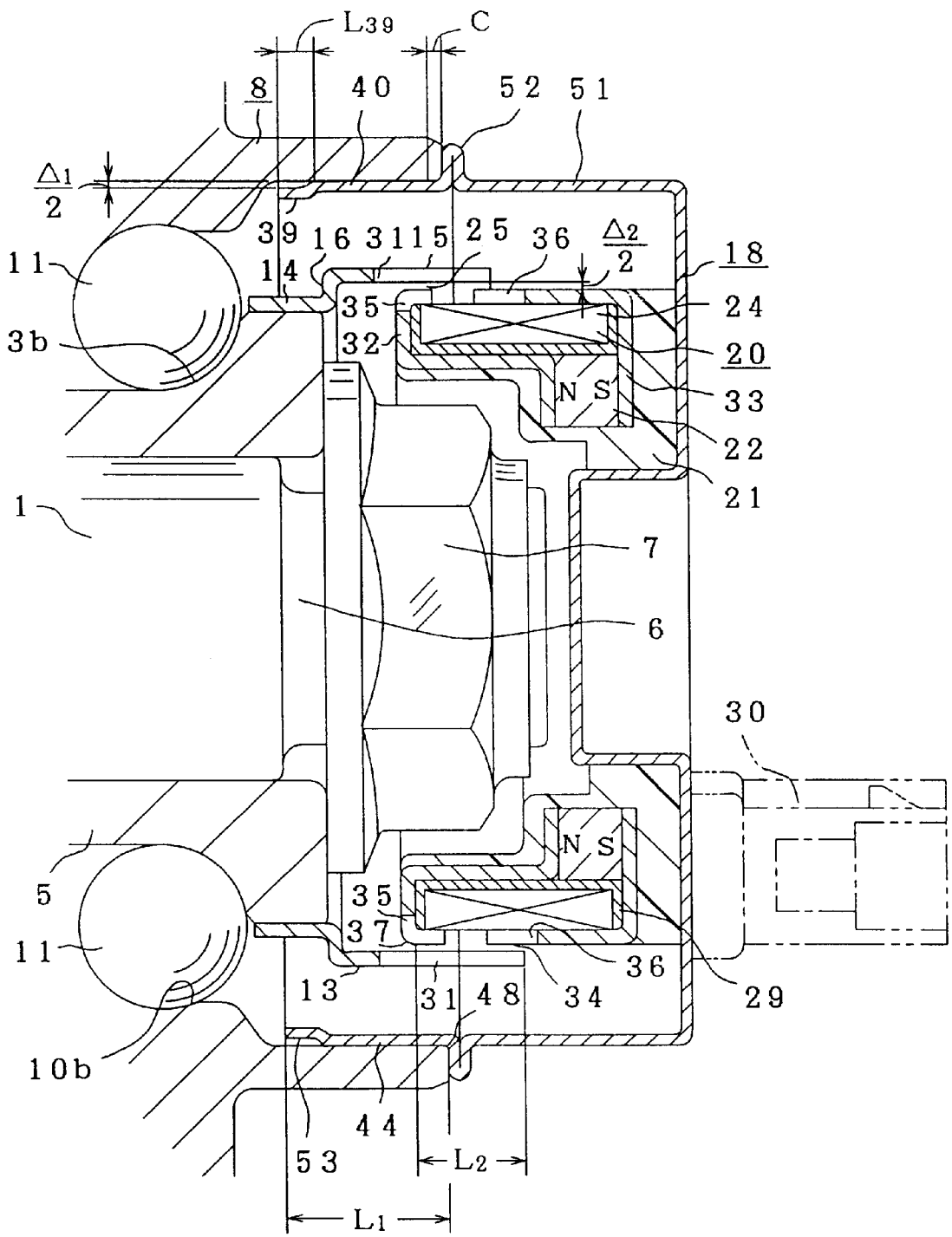
FIG. 12 is a cross sectional view of the rolling bearing unit with rotating speed sensor according to another embodiment of the present invention.

FIG. 12 shows a second embodiment of the present invention. With this embodiment, the axial length $L_{39}$ (in the left and right direction in FIG. 12) of the tip half portion 39 of the engaging portion 44, which functions as the guide, is made equal to or less than $(L_1-L_2-c)$. Consequently, with this embodiment, when the cover 18 containing the synthetic resin block 21 in which the sensor 20 is embedded, is engagingly secured to the outer ring member 8, interference engagement of the base half portion 40 of the engaging portion 44 with the inner peripheral face of the outer ring member 8, axially outer (to the left in FIG. 12) than the chamfer 48, commences prior to starting insertion of the end of the peripheral face of the sensor 20 inside the large diameter portion 15 of the tone wheel 13. After commencement of the interference engagement, the cover 18 cannot incline relative to the outer ring member 8.

Consequently, with this embodiment, it is not always necessary to impose the limits of equation (2), although applying these limits is preferable.

The limits of equation (1) however are necessary. If equation (1) is not satisfied, then the portion on the peripheral face of the sensor 20 excluding the end chamfer portion 45 is advanced inside the larger diameter portion 15 of the tone wheel 13, prior to engaging the tip half portion 39 with the inner peripheral face of the outer ring member 8 further inside than the chamfer portion 48. Consequently, if equation (1) is not satisfied, there is the possibility of the sensor 20 and the end rim of the larger diameter portion 15 of the tone wheel 13 colliding.

With the speed sensing rolling bearing unit of the present invention as described above, due to the design of the dimensional shape of the engaging portion, then when carrying out centering, not only are the tone wheel and sensor (or rather the synthetic resin body in which it is embedded) protected, but also the cover is protected. That is to say, since pressing the engaging portion into the outer ring member is not possible with the central axis of the engaging portion and the central axis of the outer ring member in an inclined condition, then the situation of the outer peripheral face of the engaging portion bit by the inner peripheral rim of the open end portion of the outer ring member no longer arises. Consequently, it is difficult for a gap to occur at the engaging faces of the engaging portion and the outer ring member, so that water tight performance of the engaging faces is improved.

Figure 2:
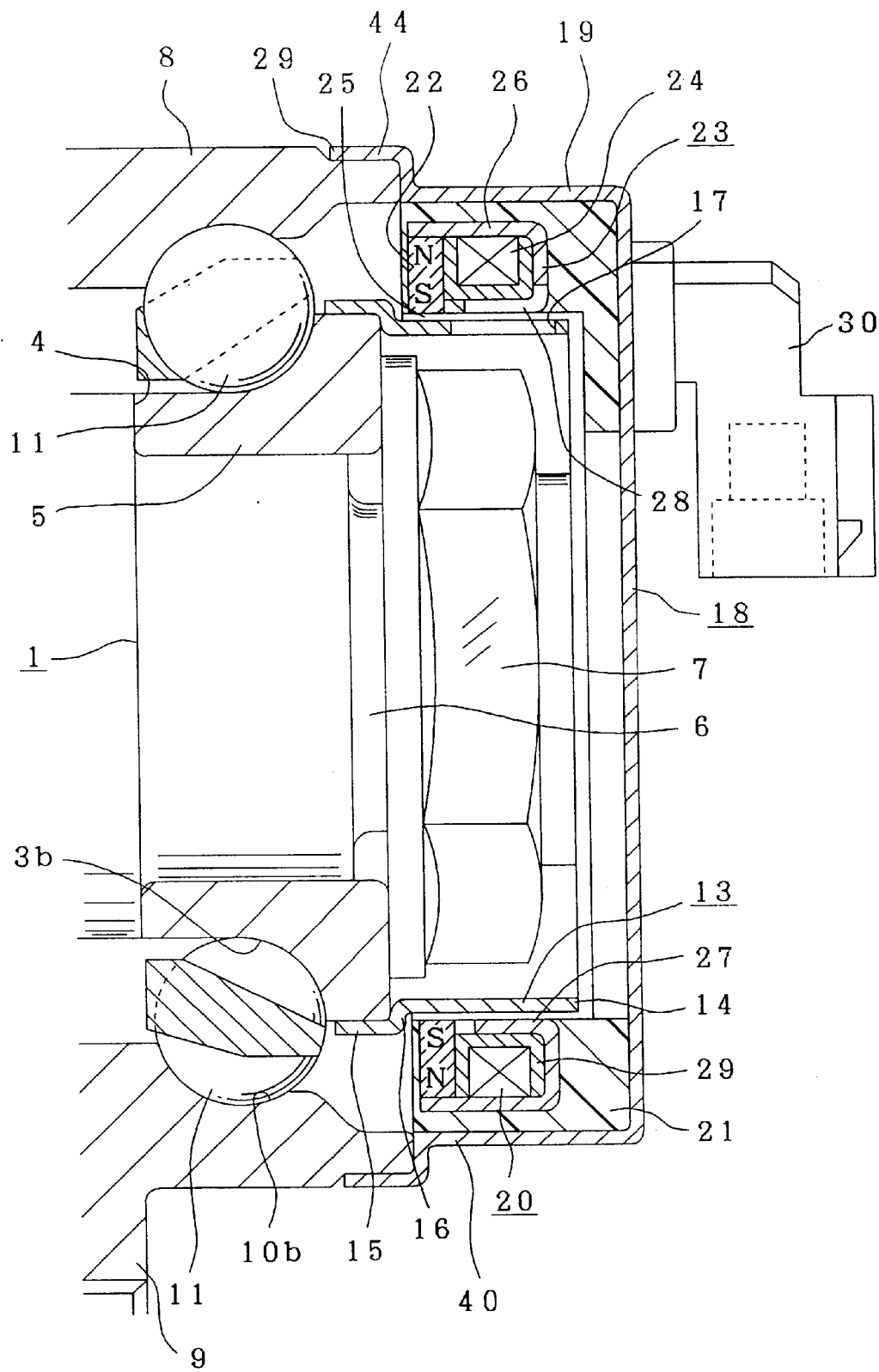
FIG. 2 is an enlarged view of portion II in FIG. 1.
Figure 3:
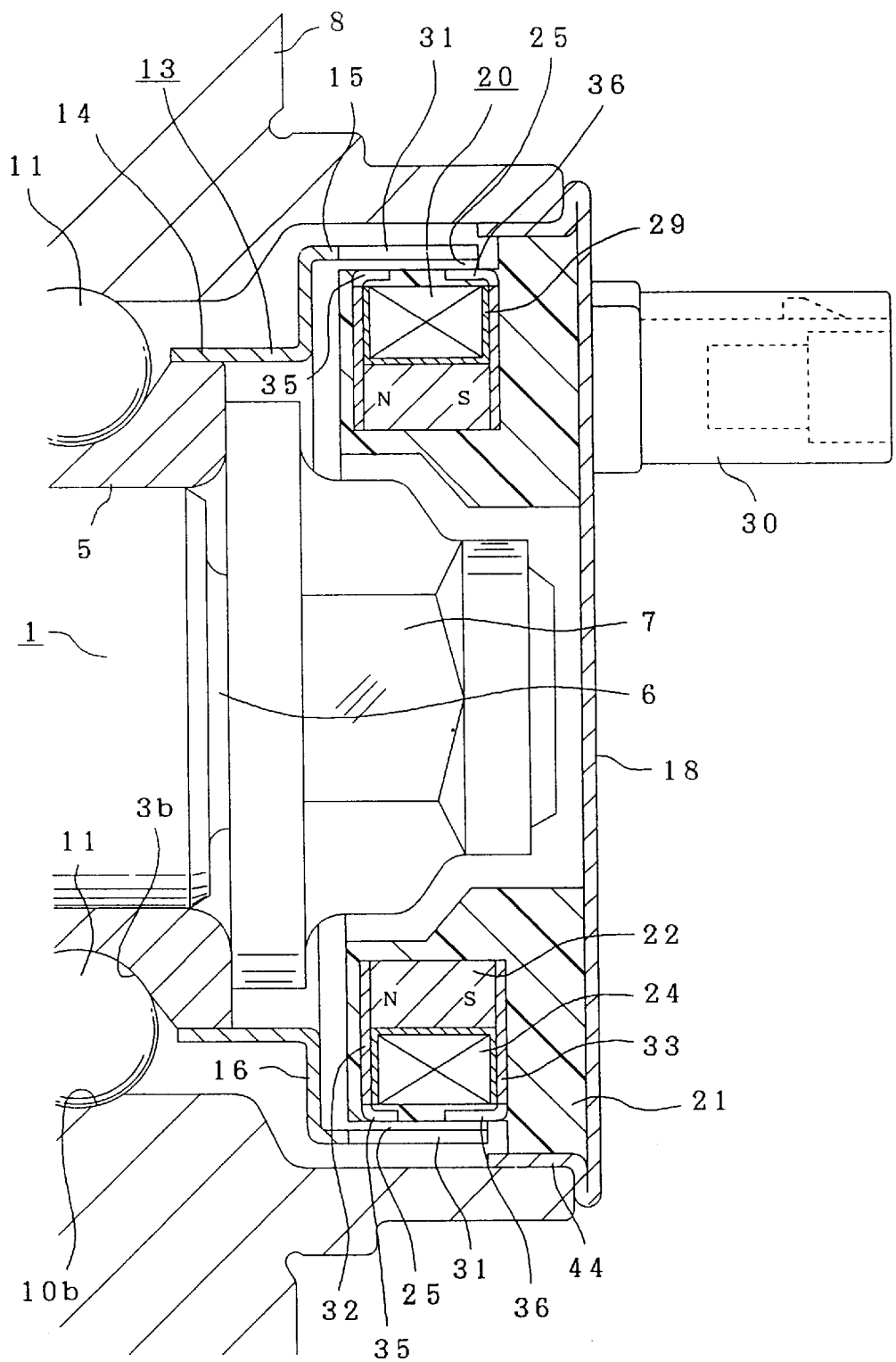
FIG. 3 is an enlarged cross sectional view of a copending JP Patent Application, similar to FIG. 2.

The respective embodiments shown in the present invention with a construction wherein the sensor is located on the inner peripheral side of the larger diameter portion of the tone wheel, as with the construction of the previous invention in the copending JP Patent Applications shown in FIG. 3. However, the present invention is also applicable to the construction, as with the conventional construction shown in the beforementioned FIGS. 1 and 2, wherein the sensor is located on the outer peripheral side of the smaller diameter portion of the tone wheel.

The first to fourth embodiments can be modified such that a guide formed on the tone wheel 13 is made with an outer diameter reducing towards the tip end, while a guide formed on the sensor (or rather the synthetic resin block 21 in which it is embedded) is made with an inner diameter increasing towards the tip end. Moreover, the fifth embodiment is applied to the abovementioned conventional construction without modification.

In the embodiments above, the engaging portion 44 formed on the cover 18 is internally fitted to the open end portion of the outer ring member 8, it is also possible to adopt the construction as with the conventional construction shown in FIGS. 1 and 2, wherein the engaging portion 44 is externally fitted to the open end portion of the outer ring member 8. In this case, the inner diameter of the tip half portion 39 of the engaging portion 44 is made slightly larger than the outer diameter of the open end portion of the outer ring member 8, while the inner diameter of the base half portion 40 is made slightly smaller than the outer diameter of the open end portion of the outer ring member 8.

Furthermore, the embodiments above may be executed in combination.

With the speed sensing rolling bearing unit of the present invention, due to the abovementioned construction and operation, the operation of concentrically assembling the sensor and the tone wheel can be easily carried out so that the attachment location of the tone wheel does not move from the established location, and there is no damage to the sensor 20 and the tone wheel 13. In particular the operation of concentrically assembling the sensor and the tone wheel, such as in carrying out maintenance at the maintenance site of the dealer (not at the vehicle manufacturer site) is not necessarily limited to being carried out by an experienced operator. With the present invention, the occurrence of the abovementioned undesirable events can be prevented even in this case with inexperienced personnel. Of course if carried out by an experienced operator at the vehicle manufacturer site, then the construction contributes to a shortening in time for the operation.

Incidentally, although the embodiments from FIG. 4 to FIG. 12 have disclosed a cover basically made from a metal member with a bottom plate, it should be noted that the scope of the present invention covers a cover comprising a synthetic resin block with no bottom plate and a fitting metal portion fitted to the outer ring member, wherein only the fitting portion is made from a metal member.

What is claimed is:

1. A rolling bearing unit with rotating speed sensor comprising a stationary outer ring member having an inner peripheral face formed with an open end portion and an outer ring raceway, a rotatable inner ring member having an outer peripheral face formed with an open end portion and an inner ring raceway, a plurality of rolling elements provided so as to be freely rotatable between the outer ring raceway and the inner ring raceway, an annular tone wheel secured to the open end portion of the inner ring member and having a cylindrical peripheral portion with a magnetism property changing at a uniform pitch in a circumferential direction, a cover comprising a synthetic resin block and a metal portion and having a cylindrical engaging portion which is fixed to the open end portion of the outer ring member by engaging the cylindrical engaging portion with the inner peripheral face at the open end portion of the outer ring member, a sensor embedded in the synthetic resin block and having a peripheral face such that the peripheral face thereof opposes at least partly the cylindrical peripheral portion of the tone wheel, and a guide formed adjacent to at least one of the cylindrical peripheral portion of the tone wheel and the peripheral face of the sensor to make the tone wheel and sensor overlapped radially with each other.

2. A rolling bearing unit with rotating speed sensor comprising a stationary outer ring member having an inner peripheral face formed with an open end portion and an outer ring raceway, a rotatable inner ring member having an outer peripheral face formed with an open end portion and an inner ring raceway, a plurality of rolling elements provided so as to be freely rotatable between the outer ring raceway and the inner ring raceway, an annular tone wheel secured to the open end portion of the inner ring member and having a cylindrical peripheral portion with a magnetism property changing at a uniform pitch in a circumferential direction, a cover comprising a synthetic resin block and a metal portion and having a cylindrical engaging portion which is fixed to the open end portion of the outer ring member by engaging the cylindrical engaging portion with the inner peripheral face at the open end portion of the outer ring member, a sensor embedded in the synthetic resin block and having a peripheral face such that the peripheral face thereof opposes at least partly the cylindrical peripheral portion of the tone wheel, the cylindrical engaging portion of the cover having a tip half portion and base half portion each having a peripheral portion faced to the inner peripheral face at the open end portion of the outer ring member, such that the tip half portion and base half portion are different in diameter, so that the tip half portion is loosely fitted to the peripheral face at the open end portion of the outer ring member while the base half portion is fitted to the peripheral face at the open end portion of the outer ring member with an interference fit.

3. A rolling bearing unit with rotating speed sensor comprising a stationary outer ring member having an inner peripheral face formed with an outer ring raceway and an open end portion having a chamfer end portion, a rotatable inner ring member having an outer peripheral face formed with an inner ring raceway and an open end portion, a plurality of rolling elements provided so as to be freely rotatable between the outer ring raceway and the inner ring raceway, an annular tone wheel secured to the open end portion of the inner ring member and having a peripheral portion with a magnetism property changing at a uniform pitch in a circumferential direction, a cover comprising a synthetic resin block and a metal portion and having a cylindrical engaging portion with an end which is fixed to the open end portion of the outer ring member by engaging the engaging portion with the inner peripheral face at the open end portion of the outer ring member, a sensor embedded in the synthetic resin block and having an end chamfer portion and a peripheral face with an end such that the peripheral face thereof opposes at least partly the peripheral portion of the tone wheel, wherein the following requirements (1) and (2) are satisfied:

(1) the engaging portion of the cover having tip and base half portions with a peripheral face portion opposed to the inner peripheral face at the open end portion of the outer ring member and being different in diameter between the tip half portion and the base half portion, so that the tip half portion loosely engages with the inner peripheral face at the open end portion of the outer ring member, while the base half portion engages with an interference fit with the inner peripheral face at the open end portion of the outer ring member, (2) with $\Delta_1$ as the difference between the diameter of the peripheral face of the tip half portion of the cover and the diameter of the peripheral face at the open end portion of the outer ring member, and $\Delta_2/2$ as the air gap between the peripheral face of the portion having the circumferentially changing magnetism property and the peripheral face of the sensor, $L_1$ as the axial length of the engaging portion, $L_2$ as the length that the portion having the circumferentially changing magnetism property of the tone wheel axially overlaps partly the peripheral face of the sensor excluding the end chamfer portion of the sensor, and $L_3$ as the axial length that the end of the engaging portion protrudes from the end of the peripheral face of the sensor excluding the chamfer portion of the sensor, and "c" as the axial length of the chamfer end portion of the open end portion of the outer ring member, then $L_1-L_2-c>0$, and, $|\{L_3-(L_1-L_2-c)/2\}\times\{\Delta_1/(L_1-L_2-c)\}|<\Delta_2/2$.

4. A rolling bearing unit with rotating speed sensor comprising a stationary outer ring member having an inner peripheral face formed with an outer ring raceway and an open end portion having a chamfer end portion and, a rotatable inner ring member having an outer peripheral face formed with an inner ring raceway and an open end portion, a plurality of rolling elements provided so as to be freely rotatable between the outer ring raceway and the inner ring raceway, an annular tone wheel secured to the open end portion of the inner ring member and having a peripheral portion having a magnetism property changing at a uniform pitch in a circumferential direction, a cover comprising a synthetic resin block and a metal portion and having a cylindrical engaging portion with an end which is fixed to the open end portion of the outer ring member by engaging the engaging portion with the inner peripheral face at the open end portion of the outer ring member, a sensor embedded in the synthetic resin block and having an end chamfer portion and a peripheral face such that the peripheral face thereof opposes at least partly the peripheral portion of the tone wheel, wherein the following requirements (1) and (2) are satisfied:

(1) the engaging portion of the cover having tip and base half portions with a peripheral face portion opposed to the inner peripheral face at the open end portion of the outer ring member and being different in diameter between the tip half portion and the base half portion, so that the tip half portion loosely engages with the inner peripheral face at the open end portion of the outer ring member, while the base half portion engages with an interference fit with the inner peripheral face at the open end portion of the outer ring member, (2) with $\Delta_1$ as the difference between the diameter of the peripheral face of the tip half portion of the cover and the diameter of the peripheral face at the open end portion of the outer ring member, and $\Delta_2/2$ as the air gap between the peripheral face of the portion having the circumferentially changing magnetism property and the peripheral face of the sensor, $L_1$ as the axial length of the engaging portion, $L_2$ as the length that the portion having the circumferentially changing magnetism property of the tone wheel axially overlaps partly the peripheral face of the sensor excluding the end chamfer portion of the sensor, and "c" as the axial length of the chamfer end portion of the open end portion of the outer ring member.

* * * * *

UNITED STATES PATENT AND TRADEMARK OFFICE
CERTIFICATE OF CORRECTION

PATENT NO.     : 6,011,388
DATED          : January 4, 2000
INVENTOR(S)    : Hiroya Miyazaki et al.

It is certified that error appears in the above-identified patent and that said Letters Patent is hereby corrected as shown below:

<u>Column 20,</u>
Last line, after "member" insert --, wherein the length of the tip half portion is equal to or less than ($L_1 - L_2 - c$) --.

Signed and Sealed this

Fourteenth Day of August, 2001

*Attest:*

NICHOLAS P. GODICI
*Attesting Officer*     *Acting Director of the United States Patent and Trademark Office*